(12) United States Patent
Antao

(10) Patent No.: US 11,232,097 B1
(45) Date of Patent: Jan. 25, 2022

(54) ORDERING COMMITS OF CODE IN MULTI-BRANCH PARALLEL DEVELOPMENT PROJECTS

(71) Applicant: T-MOBILE INNOVATIONS LLC, Overland Park, KS (US)

(72) Inventor: Jawahar Antao, Olathe, KS (US)

(73) Assignee: Sprint Communications Company L.P., Overland Park, KS (US)

(*) Notice: Subject to any disclaimer, the term of this patent is extended or adjusted under 35 U.S.C. 154(b) by 54 days.

(21) Appl. No.: 16/895,867

(22) Filed: Jun. 8, 2020

(51) Int. Cl.
| | |
|---|---|
| *G06F 9/44* | (2018.01) |
| *G06F 16/23* | (2019.01) |
| *G06F 8/71* | (2018.01) |
| *G06Q 10/10* | (2012.01) |
| *H04L 29/08* | (2006.01) |
| *G06F 8/77* | (2018.01) |
| *G06F 8/41* | (2018.01) |
| *G06F 16/27* | (2019.01) |
| *G06F 11/36* | (2006.01) |
| *G06F 8/73* | (2018.01) |
| *G06F 11/14* | (2006.01) |

(52) U.S. Cl.
CPC ............ *G06F 16/2379* (2019.01); *G06F 8/41* (2013.01); *G06F 8/71* (2013.01); *G06F 8/73* (2013.01); *G06F 8/77* (2013.01); *G06F 11/3692* (2013.01); *G06F 16/2365* (2019.01); *G06F 16/27* (2019.01); *G06Q 10/101* (2013.01); *G06Q 10/1097* (2013.01); *H04L 67/34* (2013.01); *G06F 11/1448* (2013.01)

(58) Field of Classification Search
CPC ..... G06F 8/71; G06F 8/77; G06F 8/41; G06F 8/73; G06F 16/2379; G06F 16/2365; G06F 16/27; G06F 11/3692; G06F 11/1448; G06Q 10/101; G06Q 10/1097; H04L 67/34
See application file for complete search history.

(56) References Cited

U.S. PATENT DOCUMENTS

| | | | | |
|---|---|---|---|---|
| 9,069,885 | B1* | 6/2015 | Moeller | G06F 11/1448 |
| 9,600,273 | B2* | 3/2017 | Neubeck | G06F 8/73 |
| 2018/0239898 | A1* | 8/2018 | Haerterich | G06F 8/71 |
| 2019/0377666 | A1* | 12/2019 | Klein | G06F 11/3692 |
| 2020/0192638 | A1* | 6/2020 | Pezaris | G06F 8/41 |
| 2020/0264860 | A1* | 8/2020 | Srinivasan | G06F 16/27 |

* cited by examiner

*Primary Examiner* — Tuan A Vu

(57) ABSTRACT

A method of merging commits of code in a parallel code base environment. The method comprises receiving a plurality of tickets from a ticket data store by a commit merge application executing on a computer system, wherein each ticket comprises at least one commit comprising a commit identifier and a timestamp, extracting the at least one commit identifier from each of the plurality of tickets, and ordering the extracted commit identifiers from earliest to most recently committed based on the timestamp. Based on the ordering, the method further comprises merging the commits of the test code branch with a master code branch, identifying conflicts between the commits of the test code branch with the master code branch, and resolving any identified conflicts to a later commit.

20 Claims, 6 Drawing Sheets

US 11,232,097 B1

ORDERING COMMITS OF CODE IN MULTI-BRANCH PARALLEL DEVELOPMENT PROJECTS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Version control systems manage changes made to collections of information such as source code bases. Software developers may make edits to code bases. Sometimes, there may be multiple software developers concurrently working on the same code base on separate computers and in different geographical locations. Version control systems may keep track of revisions made to source code bases and maintain different versions of the code base as software developers make their changes.

SUMMARY

In an embodiment, a method of merging commits of code in a parallel code base environment is disclosed. The method comprises receiving a plurality of tickets from a ticket data store by a commit merge application executing on a computer system, wherein each ticket comprises at least one commit identifier and timestamp associated with a commit made to a test code branch, extracting the at least one commit identifier from each of the plurality of tickets by the commit merge application, and ordering the extracted commit identifiers from earliest to most recently committed based on timestamps by the commit merge application. Based on the ordering, the method further comprises merging the commits identified by the ordered list of extracted commit identifiers of the test code branch with a master code branch by the commit merge application, identifying conflicts between the commits identified by the ordered list of extracted commit identifiers of the test code branch with the master code branch by the commit merge application, and resolving any identified conflicts to a later commit by the commit merge application.

In another embodiment, a method of merging commits of code in a parallel code base environment is disclosed. The method comprises analyzing a test code branch and a master code branch for commits by a commit merge application executing on a computer system and recording each of the commits of the test code branch and the master code branch by the commit merge application, wherein each of the commits is associated with a commit identifier and a timestamp. The method further comprises ordering the commit identifiers of the test code branch from earliest to most recently committed based on timestamps by the commit merge application, ordering the commit identifiers of the master code branch from earliest to most recently committed based on timestamps by the commit merge application, and interleaving the commit identifiers of the ordered commit identifiers of the test code branch and the master code branch based on timestamps by the commit merge application. The method further comprises merging the commits identified by the interleaved commit identifiers by the commit merge application, identifying a first set of conflicts of the commit identifiers of the test code branch by the commit merge application, identifying a second set of conflicts of the commit identifiers of the master code branch by the commit merge application, and resolving the first and second set of identified conflicts to a later commit by the commit merge application.

In yet another embodiment, a method of ordering commits of code in a multi-branch code base environment. The method comprises requesting an ordered list of commit identifiers of a test code branch from a commit data store by a commit merge application executing on a computer system, wherein each commit identifier is associated with a timestamp and a commit made to the test branch, receiving the ordered list of commit identifiers by the commit merge application, wherein the list of commit identifiers is ordered from earliest to most recently committed based on timestamps, receiving a plurality of tickets from a ticket data store by the commit merge application, wherein each ticket comprises at least one commit identifier and timestamp associated with a commit made to the test code branch. The method further comprises extracting the at least one commit identifier from each of the plurality of tickets by the commit merge application, wherein at least some commit identifiers of the ordered list of commit identifiers overlap with a commit identifier of the extracted commit identifiers, eliminating one or more commit identifiers from the ordered list of commits that do not overlap with any of the commit identifiers of the extracted commit identifiers, creating a list of final commit identifiers comprising the remaining commit identifiers from the ordered list of commit identifiers by the commit merge application, wherein the commit identifiers of the list of final commit identifiers are recorded based on the sequence of the ordered list of commit identifiers, and merging the commits associated with the commit identifiers of the list of final commit identifiers to the master code branch by the commit merge application.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
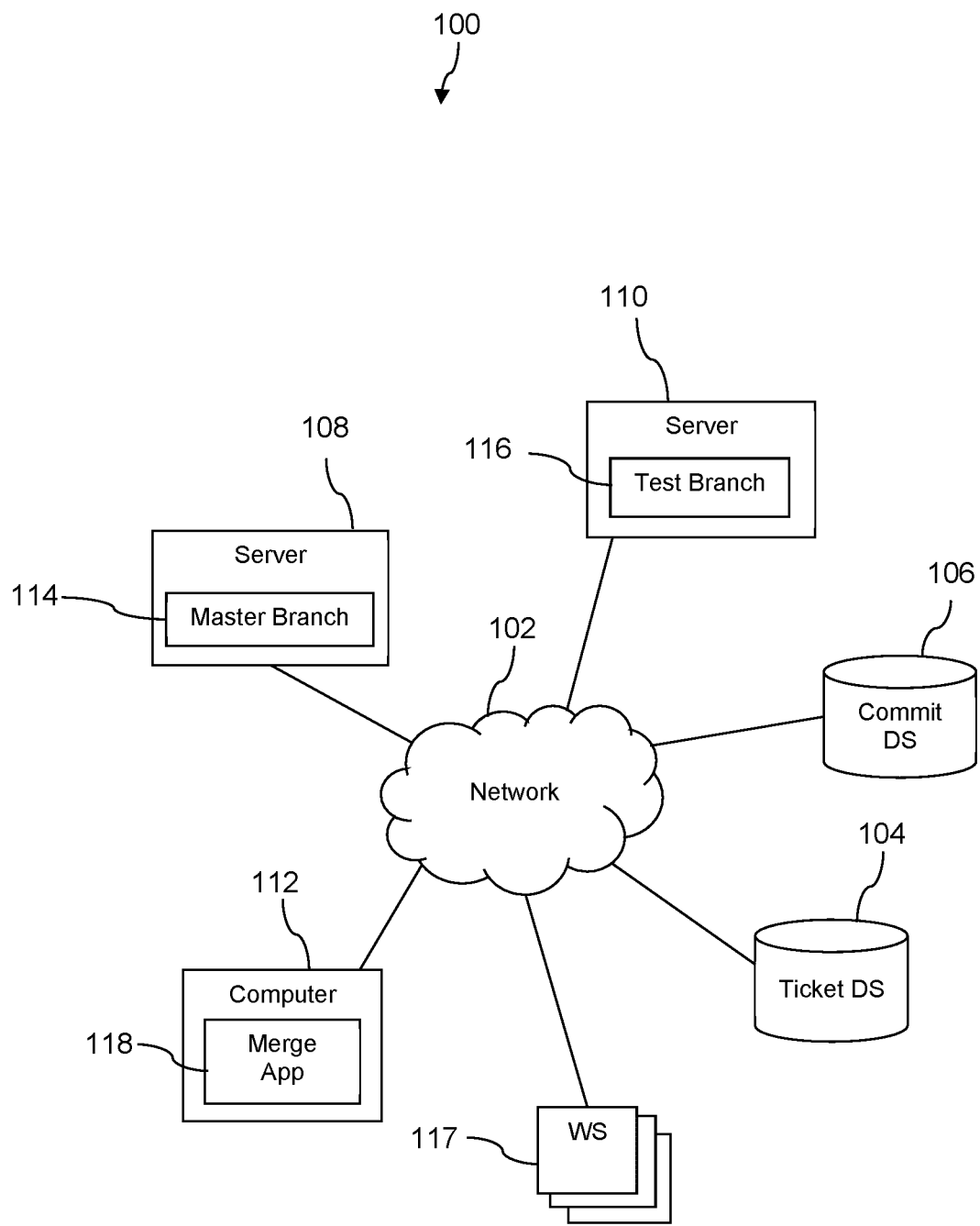
FIG. 1 is a block diagram of an ordered commit merging system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Code bases for software development projects are frequently modified and developed in order to make them more efficient, to support more features, and/or to update certain processes. Multiple software developers or software development teams may concurrently modify a code base in parallel, with multiple software developers working on different copies of the same code base. Typically, these modifications are performed on a copy of the code base, which may be referred to as a local, source, or test branch of the code base. The original copy of the code base may be stored on a server in a network and may be referred to as a remote, destination, or master branch of the code base. A code base may comprise thousands or hundreds of thousands of lines of code. Changes may also be made to the master branch by another software development team. A software developer may check out a copy of the test branch to his computer, make changes to the copy, and promulgate the changes to the test branch, making them permanent. The changes that are promulgated to the test branch may be referred to as a commit. A commit may be a release, a promulgation, or a propagation of software artifacts into a code branch. In an embodiment, a software developer may create a ticket when a commit is made to a code branch. A ticketing system manages and maintains changes and/or issues. A ticket may include information about a discrepancy between software as it currently exists and what it should be. A ticket may identify a fault, error, or bug, or it may identify a new feature to be built into a code base. In an embodiment, a ticketing system may manage and maintain commits made to a code branch. A ticket may comprise information about the commit, such as a commit identifier and a timestamp associated with the commit.

Commits made to one branch may be merged periodically with another branch to create a unified code base, so that all modifications are consistently applied. Version control systems such as Git may be used to merge the test branch with the master branch. Merging commits of one code branch (e.g., the test branch) to another branch (e.g., the master branch) entails combining different versions of some portion of a code base to create a consistent, unified code base. For example, a software developer may check out a copy of a portion of the test branch to his computer, make a change to one line of code of that portion, and commit the change, where the commit adds the change to the test branch to reflect the updated line of code. Merging the commit comprises incorporating the commit made to the test branch to the master branch, so that the test branch and the master branch both reflect the change made to that line of code, which results in a consistent, unified code base. There may be multiple software developers making commits to the test branch concurrently. In an embodiment, the commits made to the test branch may not be merged with the master branch after each commit, so multiple commits may accrue to be merged with the master branch.

A software developer may be assigned to merge the commits made over a period of time from the test branch to the master branch. For example, the software developer may merge commits made over a two-week period. There may be some instances where a longer period of time has elapsed since the prior merge, and the software developer may be assigned to merge the commits made over the past three months. He or she may receive the tickets associated with the commits to be merged and extract the commit identifier from each ticket. Depending on the project or time since the last merge, he or she may be tasked with merging anywhere from ten commits to eighty commits.

Sometimes, software developers may modify the same content in a code branch, such as making changes to the same line of code or one developer may delete a section of code that another developer modifies. For example, a team of software developers may be working on the same code base for a project. It is common that merging commits affecting the same area of the code base may result in a conflict. Conflicts are unable to be resolved automatically and may call for human intervention in order to determine how to proceed with the merge. When a conflict occurs, the merging process is paused until the conflict is resolved by a software developer. Resolving each conflict may entail that the developer reaches out to the developers involved in making the conflicting commits. The process of merging, thus, can become labor intensive and may take the developer in charge of the merge process a lot of time to complete the task.

The present disclosure teaches a system and methods of an ordered commit merging to reduce and, in some cases, eliminate conflicts that arise during the merge process thereby reducing the amount of time it takes a developer to complete the merge. In an embodiment, a software developer or a team of software developers may work on a test branch of a master code base, such as during an agile sprint. For example, billing software may be developed or modified in a first multi-developer, first concurrent development by a first software team on a first branch (e.g., the master branch) of the billing software while the same billing software is developed or modified by a second multi-developer, second concurrent development by a second software team on a second branch (e.g., the test branch).

The test branch may start out as a copy of the master branch and as members of the software development team finalize and promulgate modifications made to the test branch, the changes are saved as commits. Each time a change is committed, the software developer who made the commit may create and submit a ticket of the commit, wherein the ticket comprises a commit identifier and other information about the commit, such as the identity of the software developer that created the ticket. The ticket may be stored in a ticket data store on the network. Periodically, the software development team may desire to migrate and incorporate all the commits back to the master code base, which may be stored in a server on the network.

In an embodiment, a commit merge application may receive the tickets from the ticket data store that identify commits that need to be merged with the master branch. The commit merge application may be initiated by a software developer overseeing the merge process. The commit merge application may extract the commit identifiers from the tickets. Depending on the project or time since the last merge, the commit merge application may extract anywhere from ten commit identifiers to eighty commit identifiers. These extracted commit identifiers may be presented in an unordered, random manner. In an embodiment, ordering the commit identifiers based on the time they were committed to the test branch, from least recent to most recently committed, may help reduce the number of conflicts that arise during the merge.

The commit merge application may request a list of commit identifiers from a commit data store on the network.

For example, the commit merge application may request the last 20 commit identifiers, last 50 commit identifiers, last 100 commit identifiers, or any number of prior commit identifiers. The commit merge application may request the commit identifiers through a Git log command. The requested commit identifiers may be presented in an ordered list sorted by ascending order of timestamp (e.g., from earliest committed to most recently committed). In an embodiment, some commit identifiers from the list of requested commit identifiers may overlap with the commit identifiers that were extracted from the tickets. The commit merge application may compare the extracted commit identifiers with the list of requested commit identifiers and eliminate commit identifiers from the list of requested commit identifiers that do not overlap with any of the extracted commit identifiers. After the elimination, the commit application may create a third list comprising the overlapping commit identifiers between the extracted commit identifiers and requested commit identifiers in a time ordered sequence.

In an embodiment, the commit merge application would apply the commits in a time ordered sequence based on the third list of extracted commit identifiers from the test branch to the master branch. Applying the commits in a time ordered sequence reduces and, in some cases may eliminate, the number of conflicts in the merge process. The time ordered sequence may prevent commits from being merged out of order, for example, when multiple software developers modify the same line of code in the test branch. Not merging the commits in time ordered sequence may produce problems in the merge process, wherein later committed changes may incorporate or reference earlier committed changes when the software developer modified the test branch.

In an embodiment, changes may be committed to the master branch by a separate software development team, for example a team of software developers who are modifying the test branch. Said in other words, software development may proceed on a test branch and periodically or on specific milestones the changes on the test branch may desirably be merged back into the master branch. It may be desirable that the commits made to the master branch be merged with the test branch and commits made to the test branch be merged with the master branch. In an embodiment, ordering and merging commits made to two parallel code branches (e.g., both the test and master code branch) may be referred to as a "two-way" commit ordering approach. Commits made to the master and test branch may be independently recorded in tickets stored in the ticket data store. The commit merge application may receive the tickets associated with commits made to the master branch and tickets associated with commits made to the test branch, extract the commit identifiers of each, request a list of commit identifiers, compare the extracted commit identifiers with the requested list of commits identifiers, and create a third list of commit identifiers, wherein the list is in an interleaved time ordered sequence of commit identifiers made to the master and test branch. The commit merge application may apply the commits to the destination branch based on the time ordered sequence of the third list of commit identifiers. In an embodiment, a conflict may arise during the merge process even when applying the commits based on a time ordered sequence. The commit merge application may identify these conflicts and resolve them at a later commit. In an embodiment, resolving a conflict at a later commit may comprise human intervention by a software developer.

In an embodiment, ordering and merging commits that are made only to the test branch while the master branch remains unchanged may be referred to as a "one-way" commit ordering approach. The approach involves ordering the commit identifiers of one code branch (e.g. the test branch) in a time ordered sequence and merging the commits associated with the ordered commit identifiers to another code branch (e.g., the master branch) by the commit merge application. A two-way commit ordering approach (as described above) may be useful when multiple software development teams are modifying different copies of the same branch. For example, one software development team modifies the master branch and another software development team modifies the test branch. In an embodiment, rather than ordering the commit identifiers of one code branch, a two-way commit ordering approach (as described above) involves ordering the commit identifiers of two code branches in an interleaved time ordered sequence based on the date and time the commits were promulgated to each respective code branch before merging the commits associated with each commit identifier. For example, in a two-way commit ordering approach, the list of ordered commit identifiers may comprise, in time ordered sequence, two commit identifiers associated with commits made to the test branch, three commit identifiers associated with commits made to the master branch, and two commit identifiers associated with commits made to the test branch. The commit merge application would merge the commits based on this order, rather than merging the three commits of the master branch followed by merging the four commits of the test branch.

Turning now to FIG. 1, an ordered commit merging system 100 is described. In an embodiment, the system 100 comprises a network 102, a ticket data store 104, a commit data store 106, a remote server 108, and a remote server 110. The remote server 108 may store a master branch 114 of a code base in a non-transitory memory. In some contexts, the master branch 114 may be referred to as remote branch 114 or destination branch 114. It may be desirable that the master branch 114 may be modified or updated by one or more software developers. A copy of the master branch 114 may be created by the software developers and be stored in a non-transitory memory of the remote server 110. The copy of the master branch 114 may be referred to as a test branch 116. In some contexts, the test branch 116 may be referred to as a local branch 116 or a source branch 116. It is common for multiple software developers to work on the same project, whereby each of them works on a version of the test branch 116 on their workstations 117. In an embodiment, when a software developer makes a change to the test branch 116, the change may be "committed" to the test branch 116. The commits may be made by different software developers located in different geographic locations. The software developer may create a ticket comprising information about the commit. Information about the commit may include a commit identifier, a timestamp of when the commit was made, and an identity of the software developer. The ticket may be stored in the ticket data store 104. A list of a history of previous commit identifiers may be stored in the commit data store 106. The network 102 comprises one or more private networks, one or more public networks, or a combination thereof. It is understood that the system 100 may comprise any number of ticket data stores 104 and commit data stores 106.

Periodically, commits made to the test branch 116 may be merged with the master branch 114 to create a consistent, unified code base. For example, a software development team may want to merge commits made to a test branch 116 after an agile sprint coding session. An agile sprint occurs when a team of software developers work to complete a set amount of work within a pre-determined period of time. In an embodiment, the system 100 further comprises a computer 112 that executes a commit merge application 118. The commit merge application 118 orders the plurality of commit identifiers from the test branch 116 that identify commits that need to be merged with the master branch 114 in a time ordered sequence based on the timestamps and then merges the commits identified by the list of commit identifiers in the time ordered sequence to the master branch 114. The merge process may occur after a period of time has elapsed since the previous merge. For example, the merge process may be initiated 2 weeks, 3, weeks, 1 month, 2 months, or 3 months after the previous merge. The commit merge application 118 may be initiated by a software developer tasked with carrying out the merge process. In an embodiment, there may be numerous commits to merge, such as ten commits to eighty commits.

Figure 2:
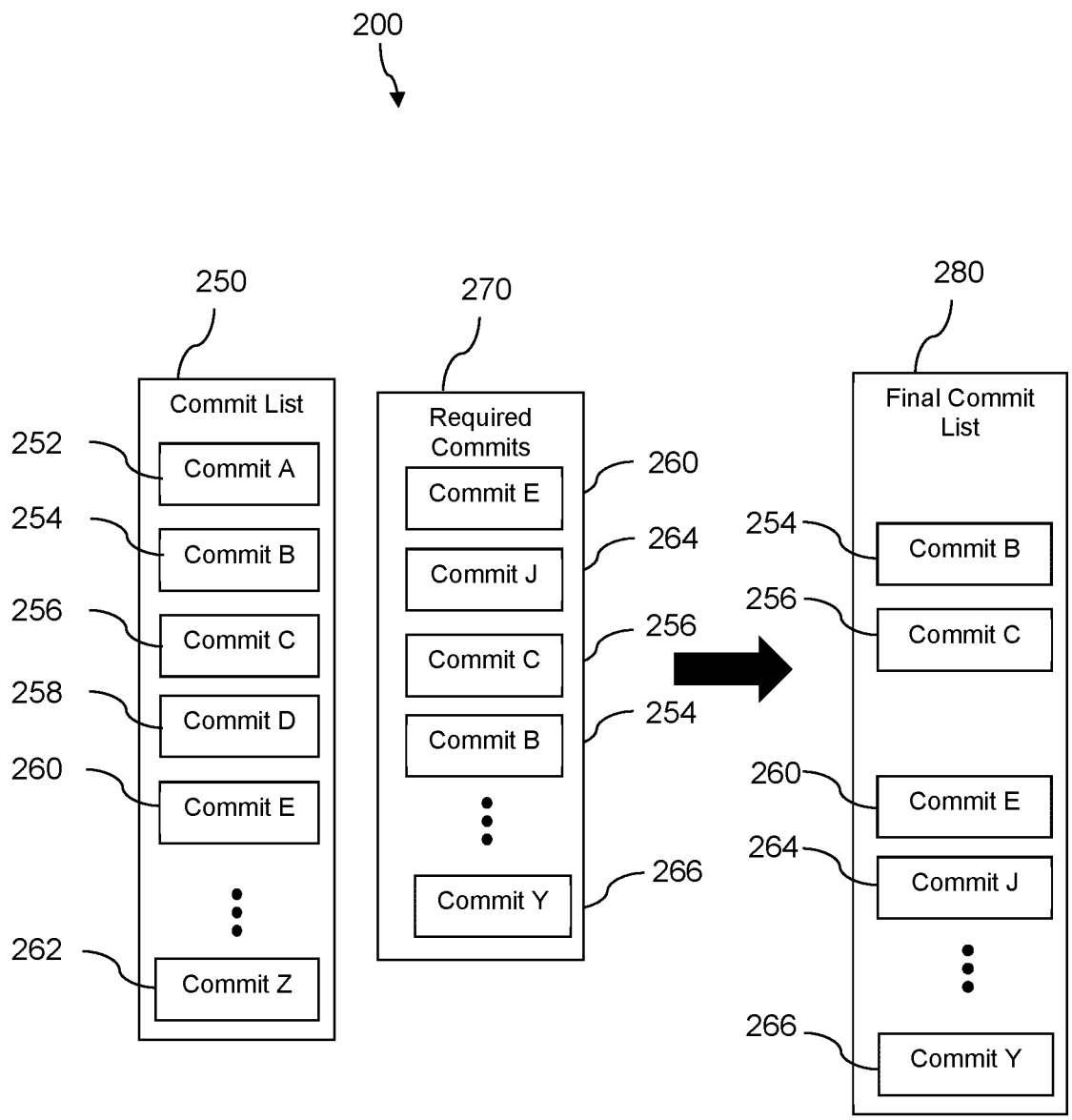
FIG. 2 is a block diagram of a system of ordering of commits according to an embodiment of the disclosure.

Turning now to FIG. 2, further details of a system 200 for ordering commit identifiers by the commit merge application 118 are provided. With reference to FIGS. 1 and 2, the commit merge application 118 receives a commit identifier list 250 from the commit data store 106. In an embodiment, commit identifier list 250 comprises a list of commit identifiers associated with a number of the most recent commits made to the test branch 116 ordered from earliest to most recently committed. For example, the ordered commit identifier list 250 may comprise the identities of last 20 commits, the last 50 commits, the last 100 commits, or some other number of prior commits. In an embodiment, commit identifier list 250 may be requested by a software developer through a Git log command. In an embodiment, commit identifier list 250 comprises commit identifier A 252, commit identifier B 254, commit identifier C 256, commit identifier D 258, commit identifier E 260, and commit identifier Z 262. The commit merge application 118 may receive a plurality of tickets from the ticket data store 104. The plurality of tickets may comprise tickets that have been created since the prior merge that are associated with commits that should be merged with the master branch 114. Each ticket comprises details about a commit made by a software developer to the test branch 116, such as a commit identifier, a timestamp of when the commit was made, and an identity of the software developer. Each ticket may comprise one or more commit identifiers. The commit merge application 118 extracts the commit identifier(s) from each ticket to create a list of required commit identifiers 270. In an embodiment, the commit identifiers from the list of required commit identifiers 270 overlap with some of the commit identifiers of the commit identifier list 250. The commit identifiers of the list of required commit identifiers 270 may be in a random order. For example, the list of required commit identifiers 270 may comprise commit identifier E 260, commit identifier J 264, commit identifier C 256, commit identifier B 254, and commit identifier Y 266. In an embodiment, the list of required commit identifiers 270 may comprise at least eighty commit identifiers. The commit merge application 118 compares the commit identifier list 250 to the list of required commit identifiers 270 and eliminates the commit identifiers that do not overlap from the commit identifier list 250, creating a final commit identifier list 280. By eliminating the commit identifiers that do not overlap, the final commit identifier list 280 comprises commit identifiers from the list of required commit identifiers 270 ordered based on the time ordered sequence of commit identifier list 250 instead of the random order of commit identifiers of the list of required commit identifiers 270. For example, final commit identifier list 280 may comprise commit identifier B 254, commit identifier C 256, commit identifier E 260, commit identifier J 264, and commit identifier Y 266.

In an embodiment, the master branch 114 may be modified by a software development team as a separate software development team is modifying the test branch 116. The teams may desire to periodically merge the commits of the master branch 114 to the test branch 116 and merge the commits of the test branch 116 to the master branch 114. The commit merge application 118 receives an ordered commit identifier list 250 from the commit data store 106 identifying the most recent commits made to the master branch 114 and test branch 116. The commit merge application 118 receives tickets from the ticket data store 104 comprising tickets associated with commits of the master branch 114 and the test branch 116, wherein each ticket comprises at least one commit identifier. The commit merge application 118 extracts the commit identifier(s) from each ticket and creates a list of required commit identifiers 270 comprising commit identifiers in a random order. The commit merge application 118 compares the commit identifier list 250 and the list of required commit identifiers 270 and eliminates commit identifiers from the commit identifier list 250 that do not overlap, creating a final commit identifier list 280 comprising an interleaved time ordered list of commit identifiers associated with commits made to the master branch 114 and the test branch 116.

In an embodiment, the commit merge application 118 takes the final commit identifier list 280 and merges commits identified by commit identifier B 254, commit identifier C 256, commit identifier E 260, commit identifier J 264, and commit identifier Y 266 to the master branch 114. In an embodiment, the commits may be merged by a script application. For example, a Git cherry-pick command may be executed to merge the commits associated with the final commit identifier list 280. Merging commits identified by the commit identifiers based on the time ordered sequence of the final commit identifier list 280 rather than in the random order of the list of required commit identifiers 270 reduces the possibility for conflicts during the merge process. It is understood that the commit merge application 118 may not completely eliminate conflicts during the merge process. For example, if commit identifier B 254, commit identifier C 256, and commit identifier E 260 identify commits made by a software developer A, a software developer B, and a software developer C, respectively, to the same line of code in the test branch 116, the merge process may result in a conflict. A conflict may call for human intervention, such as a software developer manually resolving the conflict. In an embodiment, if the merge process raises a conflict, the conflict may be resolved to a later commit. For example, instead of halting the merge process and waiting for human intervention whenever a conflict occurs, the commit merge application 118 may log the conflict and move on to the next commit in the final commit identifier list 280, accruing all conflicts during the merge process for review by a software developer at the conclusion of the merge.

Figure 3:
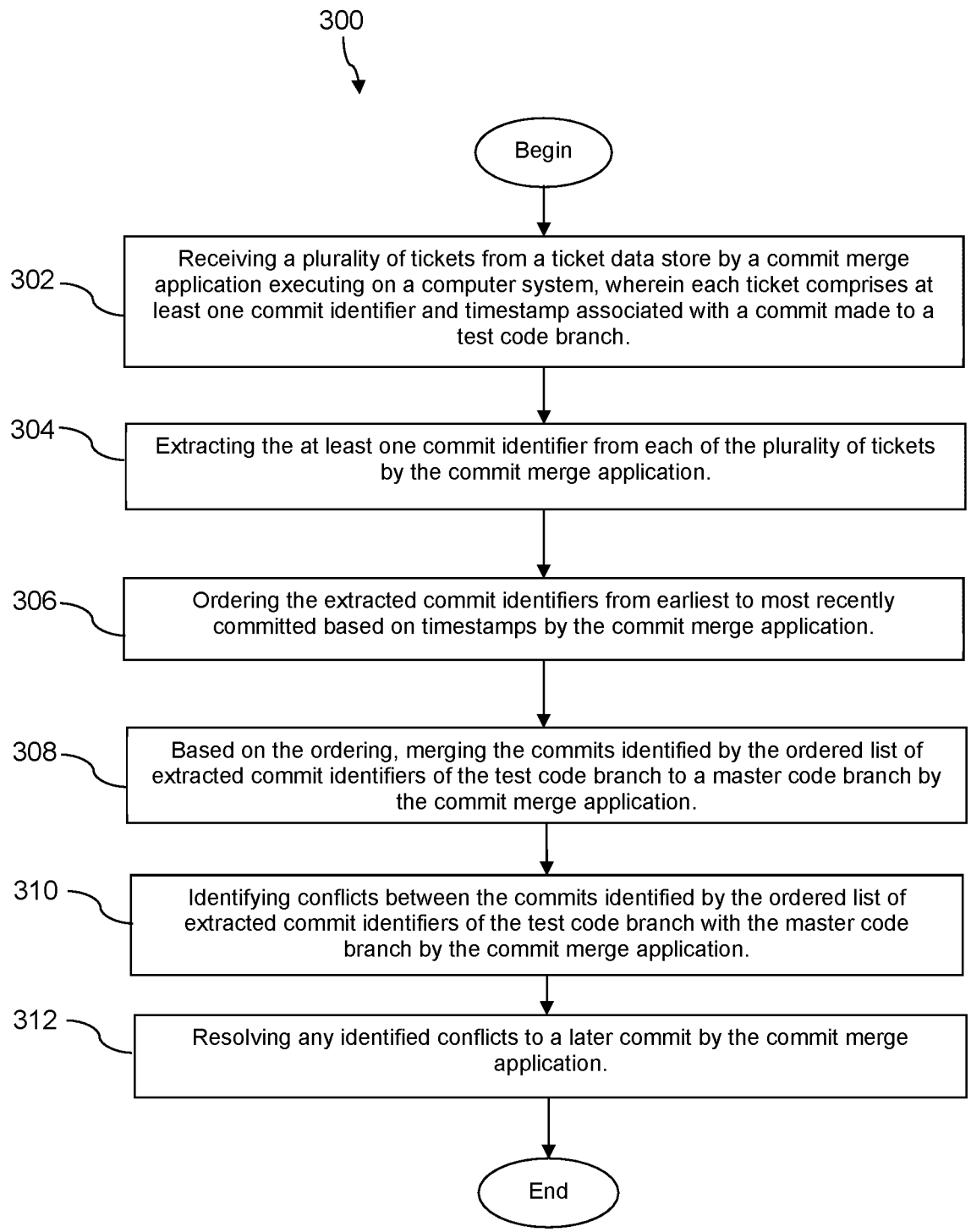
FIG. 3 is a flow chart of a method according to an embodiment of the disclosure.

Turning now to FIG. 3, a method 300 is described. In an embodiment, the method 300 is a method of merging commits of code in a parallel code base environment. For example, the method 300 may be implemented to merge a plurality of commits of code from a test branch 116 to a master branch 114. At block 302, the method 300 comprises receiving a plurality of tickets from a ticket data store by a commit merge application executing on a computer system, wherein each ticket comprises at least one commit comprising a commit identifier and a timestamp associated with a commit made to a test code branch. In an embodiment, a ticket may be created by a software developer that finalizes the commit to the test branch 116. The ticket may comprise information in addition to the commit identifier and timestamp, such as an identity of the software developer that created the ticket. The timestamp may be determined based on when the change was committed to the test branch 116. At block 304, the method 300 comprises extracting the at least one commit identifier from each of the plurality of tickets by the commit merge application. In an embodiment, the extracted commit identifiers may be in a random order. At block 306, the method 300 comprises ordering the extracted commit identifiers from earliest to most recently committed based on the timestamp by the commit merge application.

The method 300 further comprises, at block 308, based on the ordering, merging the commits of the test code branch to a master code branch by the commit merge application. At block 310, the method 300 comprises identifying conflicts between the commits of the test code branch with the master code branch by the commit merge application. In an embodiment, merging the commits based on the time ordered sequence At block 312, the method 300 comprises resolving any identified conflicts to a later commit by the commit merge application.

Figure 4:
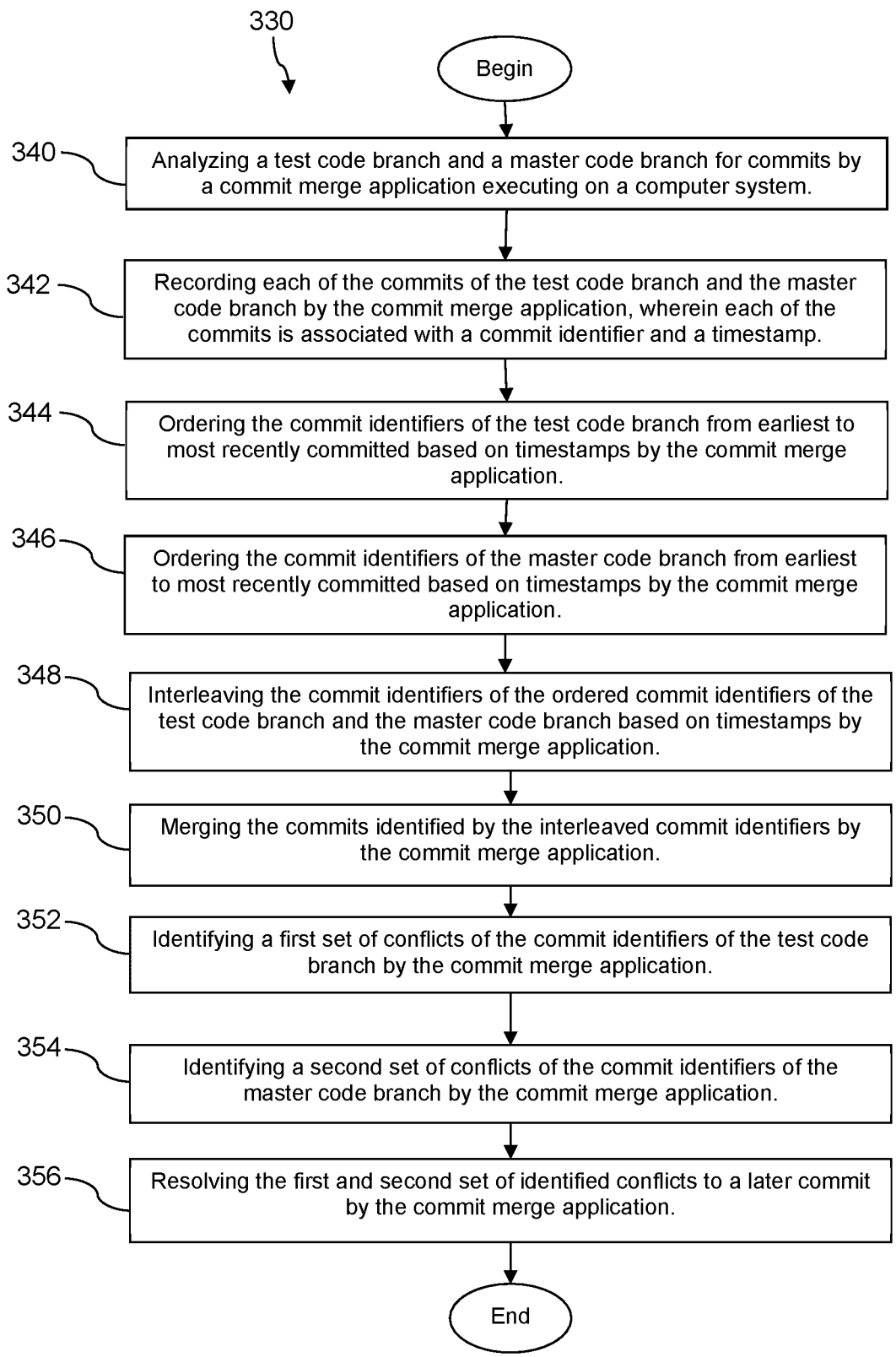
FIG. 4 is a flow chart of another method according to an embodiment of the disclosure.

Turning now to FIG. 4, a method 330 is described. In an embodiment, the method 330 is a method of merging commits of code in a parallel code base environment. At block 340, the method 330 comprises analyzing a test code branch and a master code branch for commits by a commit merge application executing on a computer system. In an embodiment, analyzing the test branch 116 and master branch 114 may comprise receiving a plurality of tickets from the ticket data store 104 and extracting commit identifiers from the tickets by the commit merge application 118. A ticket may comprise commit information made to the test branch 116 or master branch 114. At block 342, the method 330 comprises recording each of the commits of the test code branch and the master code branch by the commit merge application, wherein each of the commits comprises a commit identifier and a timestamp. The commit identifiers may be recorded in a random order.

At block 344, the method 330 further comprises ordering the commit identifiers of the test code branch from earliest to most recently committed based on the timestamp by the commit merge application. At block 346, the method 330 comprises ordering the commit identifiers of the master code branch from earliest to most recently committed based on the timestamp by the commit merge application. In an embodiment, the ordered commit identifiers may exist in two independent lists. At block 348, the method 330 comprises interleaving the commit identifiers of the ordered commit identifiers of the test code branch and the master code branch based on the timestamp by the commit merge application. In an embodiment, the interleaved list of commit identifiers comprises a combination of the time ordered list of commit identifiers of the test branch 116 and master branch 114. At block 350, the method 350 comprises merging the commits by the commit merge application.

At block 352, the method 330 further comprises identifying a first set of conflicts of the commit identifiers of the test code branch. At block 354, the method 330 comprises identifying a second set of conflicts of the commit identifiers of the master code branch. Finally, at block 356, the method 330 comprises resolving the first and second set of identified conflicts to a later commit.

Figure 5:
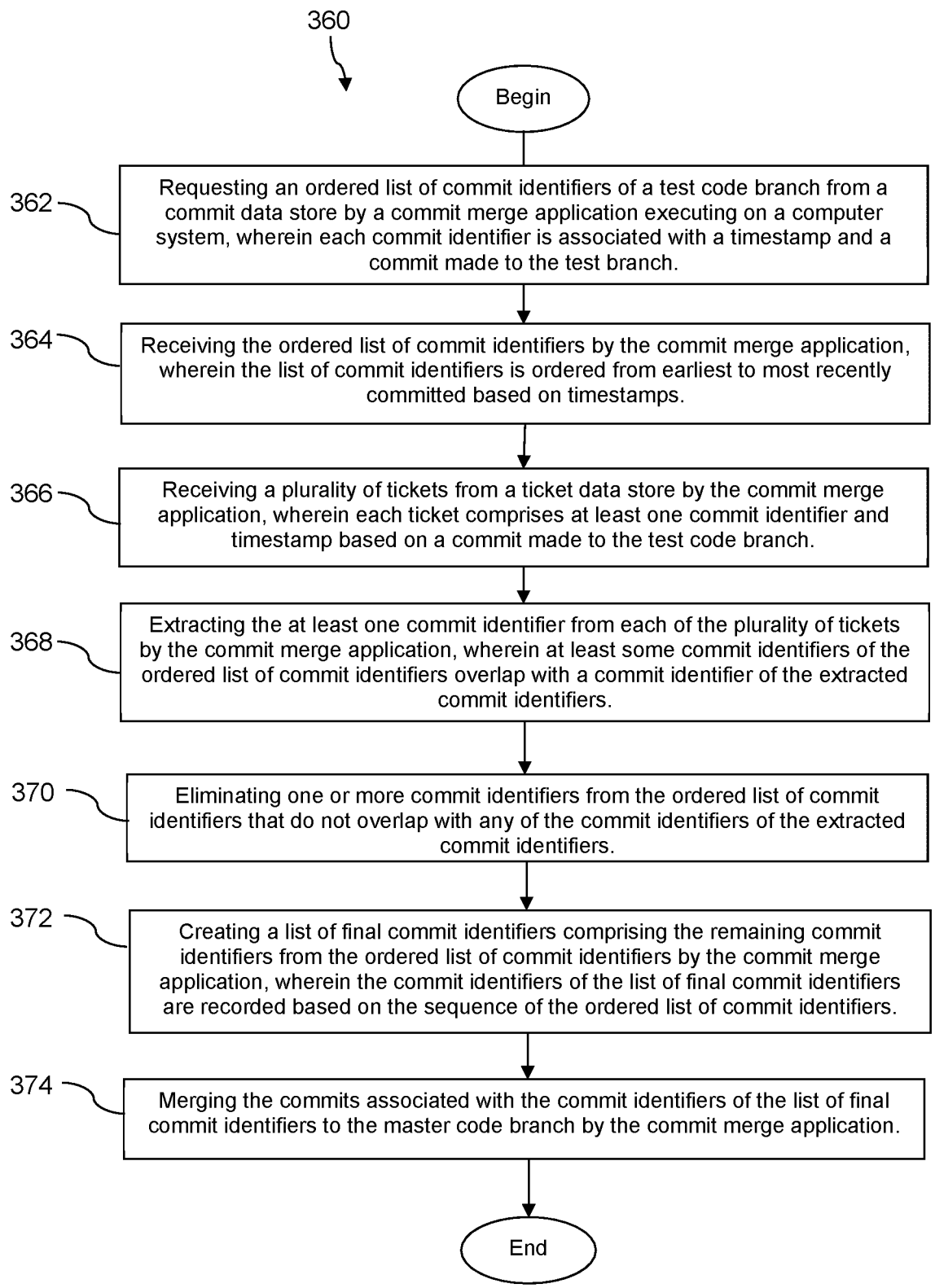
FIG. 5 is a flow chart of yet another method according to an embodiment of the disclosure.

Turning now to FIG. 5, a method 360 is described. In an embodiment, the method 360 is a method of ordering commits of code in a multi-branch code base environment, comprising. At block 362, the method 360 comprises requesting an ordered list of commits of a test code branch from a commit data store by a commit merge application executing on a computer system, wherein each commit comprises a commit identifier and a timestamp. At block 364, the method 360 comprises receiving the ordered list of commits by the commit merge application, wherein the list of commits is ordered from earliest to most recently committed based on the timestamp. At block 366, the method 360 comprises receiving a plurality of tickets from a ticket data store by an application by the commit merge application, wherein each ticket comprises at least one commit identifier based on a change made to the test code branch.

At block 368, the method 360 further comprises extracting the at least one commit identifier from each of the plurality of tickets by the commit merge application, wherein at least some commit identifiers of the ordered list of commits overlap with a commit identifier of the extracted commit identifiers. At block 370, the method 360 comprises eliminating one or more commit identifiers from the ordered list of commits that do not overlap with any of the commit identifiers of the extracted commit identifiers. At block 372, the method 360 comprises creating a list of final commits comprising the remaining commit identifiers from the ordered list of commits by the commit merge application, wherein the commit identifiers of the list of final commits are recorded based on the sequence of the ordered list of commits. At block 374, the method 360 comprises merging the commit identifiers of the list of final commits to the master code branch by the commit merge application.

Figure 6:
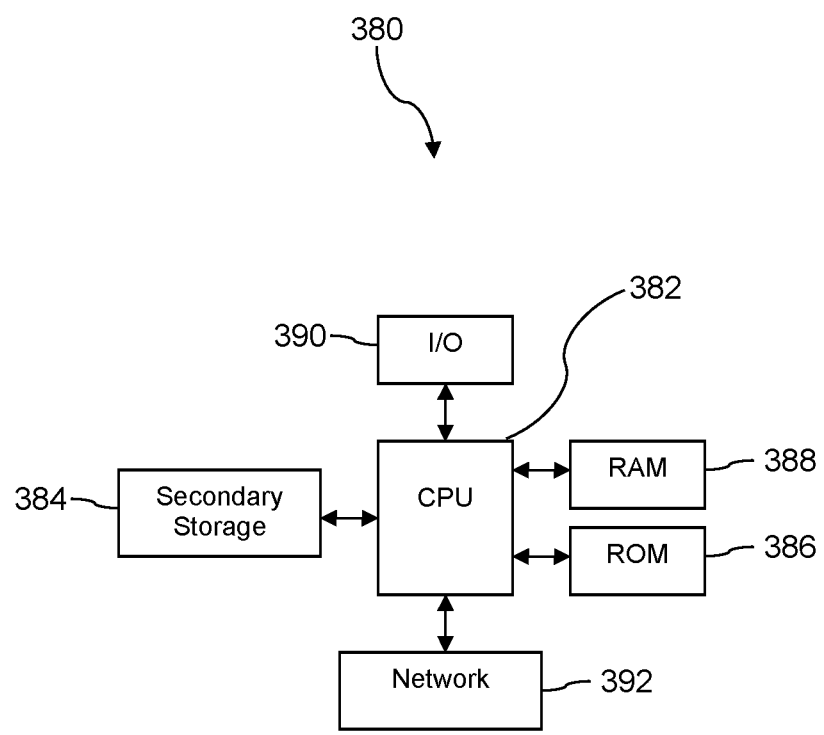
FIG. 6 is a block diagram of a computer system according to an embodiment of the disclosure.

FIG. 6 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of merging commits of code in a parallel code base environment, comprising:

receiving a plurality of tickets from a ticket data store by a commit merge application executing on a computer system, wherein each ticket comprises at least one commit identifier and timestamp associated with a commit made to a test code branch;

extracting the at least one commit identifier from each of the plurality of tickets by the commit merge application;

ordering the extracted commit identifiers from earliest to most recently committed based on timestamps by the commit merge application;

based on the ordering, merging the commits identified by the ordered list of extracted commit identifiers of the test code branch with a master code branch by the commit merge application;

identifying conflicts between the commits identified by the ordered list of extracted commit identifiers of the test code branch with the master code branch by the commit merge application; and resolving any identified conflicts to a later commit by the commit merge application.

2. The method of claim 1, wherein the commits of the test code branch are merged every 2 weeks, every 3 weeks, every month, every 2 months, or every 3 months.

3. The method of claim 1, wherein the commit merge application extracts at least eighty commit identifiers from the plurality of tickets.

4. The method of claim 1, wherein the extracted commit identifiers from each of the plurality of tickets are in a random order.

5. The method of claim 1, wherein the commits are made by a software development team.

6. The method of claim 5, wherein each member of the software development team is located in a separate geographic location.

7. The method of claim 1, wherein each of the plurality of tickets further comprises an identity of a software developer that created the commit.

8. The method of claim 1, wherein resolving an identified conflict to a later commit comprises human intervention comprising contacting the software developer associated with the identity information of the ticket.

9. A method of merging commits of code in a parallel code base environment, comprising:

analyzing a test code branch and a master code branch for commits by a commit merge application executing on a computer system;

recording each of the commits of the test code branch and the master code branch by the commit merge application, wherein each of the commits is associated with a commit identifier and a timestamp;

ordering the commit identifiers of the test code branch from earliest to most recently committed based on timestamps by the commit merge application;

ordering the commit identifiers of the master code branch from earliest to most recently committed based on timestamps by the commit merge application;

interleaving the commit identifiers of the ordered commit identifiers of the test code branch and the master code branch based on timestamps by the commit merge application;

merging the commits identified by the interleaved commit identifiers by the commit merge application;

identifying a first set of conflicts of the commit identifiers of the test code branch by the commit merge application;

identifying a second set of conflicts of the commit identifiers of the master code branch by the commit merge application; and resolving the first and second set of identified conflicts to a later commit by the commit merge application.

10. The method of claim 9, wherein the test code branch is stored remotely on a network server.

11. The method of claim 9, wherein the master code branch is stored remotely on a network server.

12. The method of claim 9, wherein the commits of the test code branch are merged every 2 weeks, every 3 weeks, every month, every 2 months, or every 3 months.

13. The method of claim 9, wherein the merge is initiated upon the conclusion of an agile sprint coding session.

14. The method of claim 13, wherein the timestamp associated with a commit is based on when the change is committed to the master code branch or test code branch.

15. A method of ordering commits of code in a multi-branch code base environment, comprising:

requesting an ordered list of commit identifiers of a test code branch from a commit data store by a commit merge application executing on a computer system, wherein each commit identifier is associated with a timestamp and a commit made to the test branch;

receiving the ordered list of commit identifiers by the commit merge application, wherein the list of commit identifiers is ordered from earliest to most recently committed based on timestamps;

receiving a plurality of tickets from a ticket data store by the commit merge application, wherein each ticket comprises at least one commit identifier and timestamp associated with a commit made to the test code branch;

extracting the at least one commit identifier from each of the plurality of tickets by the commit merge application, wherein at least some commit identifiers of the ordered list of commit identifiers overlap with a commit identifier of the extracted commit identifiers;

eliminating one or more commit identifiers from the ordered list of commit identifiers that do not overlap with any of the commit identifiers of the extracted commit identifiers;

creating a list of final commit identifiers comprising the remaining commit identifiers from the ordered list of commit identifiers by the commit merge application, wherein the commit identifiers of the list of final commit identifiers are recorded based on the sequence of the ordered list of commit identifiers; and merging the commits associated with the commit identifiers of the list of final commit identifiers to the master code branch by the commit merge application.

16. The method of claim 15, wherein the commit identifiers of the list of final commit identifiers are in a time ordered sequence based on when the change to the test code branch was committed.

17. The method of claim 15, wherein the commit merge application requests the ordered list of commit identifiers through executing a Git log command.

18. The method of claim 15, wherein the list of final commit identifiers is merged to the master code branch through executing a script.

19. The method of claim 18, wherein the script is a Git cherry-pick command.

20. The method of claim 15, wherein the list of final commit identifiers comprises at least eighty commit identifiers.

* * * * *